(12) United States Patent
Buil et al.

(10) Patent No.: US 10,353,730 B2
(45) Date of Patent: Jul. 16, 2019

(54) RUNNING A VIRTUAL MACHINE ON A DESTINATION HOST NODE IN A COMPUTER CLUSTER

(71) Applicant: Telefonaktiebolaget LM Ericsson (publ), Stockholm (SE)

(72) Inventors: Manuel Buil, Aachen (DE); Claudia Mayntz, Herzogenrath (DE); Matthias Schreiber, Aldenhoven (DE); Marc Vorwerk, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/547,582

(22) PCT Filed: Feb. 12, 2015

(86) PCT No.: PCT/EP2015/052932
§ 371 (c)(1),
(2) Date: Jul. 31, 2017

(87) PCT Pub. No.: WO2016/128049
PCT Pub. Date: Aug. 18, 2016

(65) Prior Publication Data
US 2018/0032362 A1    Feb. 1, 2018

(51) Int. Cl.
*G06F 9/455*    (2018.01)
*G06F 9/48*    (2006.01)
(Continued)

(52) U.S. Cl.
CPC ........ *G06F 9/45558* (2013.01); *G06F 9/4856* (2013.01); *G06F 9/5077* (2013.01);
(Continued)

(58) Field of Classification Search
CPC .................................................. G06F 9/45558
See application file for complete search history.

(56) References Cited

U.S. PATENT DOCUMENTS

2003/0195917 A1* 10/2003 Horiyama ............. G06F 3/1203
                                                     718/102
2009/0259734 A1* 10/2009 Morikawa ................ G06F 8/61
                                                     709/220
(Continued)

FOREIGN PATENT DOCUMENTS

WO    2013165354 A1    11/2013

OTHER PUBLICATIONS

Gulati, A. et al., "BASIL: Automated IO Load Balancing Across Storage Devices", FAST '10 Proceedings of the 8th USENIX Conference on File and Storage Technologies, Feb. 23-26, 2010, pp. 1-14, San Jose, California.

(Continued)

*Primary Examiner* — Charlie Sun
(74) *Attorney, Agent, or Firm* — Coats & Bennett, PLLC (57) ABSTRACT

The present invention relates to a method for running a virtual machine on a destination host node in a computer cluster, comprising the steps of requesting (S101) a set of target configuration parameters assigned to the virtual machine, wherein the target configuration parameters have prioritizations; requesting (S102) a set of actual configuration parameters of the destination host node for checking against the requested set of target configuration parameters; and running (S103) the virtual machine on the destination host node, if the set of actual configuration parameters of the destination host node falls within the set of target configuration parameters, wherein when selecting destination host node, the prioritization of the target configuration parameters is considered.

13 Claims, 5 Drawing Sheets

(51) Int. Cl.
 H04L 29/08 (2006.01)
 G06F 9/50 (2006.01)
 H04L 12/24 (2006.01)
(52) U.S. Cl.
 CPC .......... H04L 41/0806 (2013.01); H04L 67/10 (2013.01); *G06F 2009/4557* (2013.01); *G06F 2009/45575* (2013.01)

(56) References Cited

U.S. PATENT DOCUMENTS

2011/0202640 A1   8/2011  Pillutla
2014/0143391 A1*  5/2014  Tanigawa ............ G06F 9/45558
                                              709/221

OTHER PUBLICATIONS

Hogan, C., "vSphere 5.0 Storage Features Part 5—Storage DRS—Balance on Space Usage", Jul. 20, 2011, pp. 1-10, retrieved on Jun. 27, 2017, retrieved from Internet https://blogs.vmware.com/vsphere/2011/07/vsphere-50-storage-features-part-6-stoarge-dr.
Vsphere, "Enhanced Application Performance and Availability", pp. 1-12, retreived on Jun. 27, 2017, retrieved from Internet https://www.wmare.com/products/vsphere/enhanced-app-performance.html.
European Telecommunications Standards Institute, "Network Functions Virtualisation (NFV); Architectural Framework", ETSI GS NFV 002 V1.1.1, Oct. 2013, pp. 1-21.
Vmware, "vSphere 5.0 Evaluation Guide, vol. Two—Advanced Storage Features", Technical White Paper, Aug. 2011, pp. 1-52.

* cited by examiner

RUNNING A VIRTUAL MACHINE ON A DESTINATION HOST NODE IN A COMPUTER CLUSTER

TECHNICAL FIELD

The present invention relates to a method for running a virtual machine on a destination host node in a computer cluster, a control node, and a computer cluster system.

BACKGROUND

Inside cloud environments, the concept of computer clusters is widely used in order to increase the resiliency of services, improve the efficiency in usage of resources and protect applications running on it from hardware failure. This concept groups together several host nodes, creating a single logical pool of resources, such as a central processing units CPUs or memory that brings more flexibility to the applications.

Inside a cluster, a cluster resource management runs as a service. This service groups the resources of the different host nodes and presents the aggregated resources as one huge host to a virtual machine. The cluster resource management applies cluster resource allocation policies in order to decide which host node of the cluster will serve the virtual machine.

Cluster resource allocation policies can aim for different results such as having a load balanced cluster or having minimal power consumption. It can also help during upgrade procedures, since it is able to evacuate virtual machines from the host node to be upgraded. Regarding a load balancing policy, the active workload and available resources are continuously monitored. These resources are CPU and memory. When an unbalance is detected the cluster resource management leverages a procedure that moves the virtual machine to another host node in the computer cluster on which the amount of resources is sufficient and the state is healthy.

Another related service can be defined as storage resource manager. This service is based on the concept of clustering applied in the storage area. When the virtual machine is initially deployed, the administrator of the cloud environment is responsible to find the best storage volume for that virtual machine. This process is not done automatically and it is cumbersome, because there are multiple parameters that can influence which storage volume is the optimal for the specific virtual machine. Probably there will be several storage volumes to choose from. Further decisions can be made on the basis of load balancing strategies.

When using the storage resource manager, a group of storage volumes will be clustered together creating a single logical storage volume that represents the cluster system. The cloud administrator can choose the logical volume as the desired storage back-end for the specific virtual machine. Then checking the capacity needed by the virtual machine, its storage profile and how the cluster system is balanced influence which of the storage volumes of the cluster system is most suitable. A storage profile can include parameters such as maximum latency, read/write ratio, block size or other parameter, like a random/sequential ratio.

Understanding the storage profile of a virtual machine helps to identify the most performing storage volume. However, not only the storage area is affected, but also other resources such as CPU and memory. To address this problem and to simplify the optimal deployment of virtual machines in a cloud environment the Open Virtualization Format OVF is set up. OVF is a packaging standard designed to address the portability and deployment of virtual machines. OVF collects important parameters that define the resources needed by the virtual machine in order to run correctly. OVF is hypervisor agnostic and a project running under Distributed Management Task Force DMTF.

Today storage and the network can also be configured in order to fulfill different levels of data confidentiality and multi-tenancy. For example, data can be encrypted at different levels of the Storage Area Network SAN and stored in self-encrypted disks. Besides, there are also different configurations that could bring better security levels from the storage perspective such as providing one Logical Unit Number LUN per tenant.

In a cloud environment, different applications run with different security requirements. Even within a single application different security requirements depending on the data can be found. As a consequence, the network and storage solution may not only support a single security configuration, since this would not be sufficient for all applications. Instead, the storage solution adapts itself or offers a variety of security ecosystems that can coexist in the same cloud environment. These ecosystems are created by combining the distinct security features that are available in the network and storage solution and that can change during the lifetime of the application. However, during the whole lifetime Service Level Agreements of the providers related to storage security features should be met.

Migration of the virtual machine can lead to a degraded availability of storage resources, performance and Virtualized Network Functions VNF, to which the virtual machine contributes to. Telecommunication nodes are mostly clustered and comprise a number of virtual machines, when running virtualized. Without respect to security, the administrator of the cloud manually checks that the confidentiality of the data as well as the multi-tenancy requirements of the applications are fulfilled. Since this is a difficult task for the administrator, a chosen solution is easily over engineered or oversimplified.

When a virtual machine is migrated from one host node to another, existing migration mechanisms assure the compatibility of the destination host node with respect to available network resources or storage resources in use by the virtual machine on the target host. If the virtual machine is running on a computer cluster and the cluster manager service triggers the migration, the CPU and the memory in the new destination host will be verified. If everything is correct, the virtual machine is migrated.

Nevertheless, it can happen that the new destination host has not the same connectivity in terms of bandwidth, delay or jitter to the storage. For example, it may turn out that the new destination host node has only a path with 1 Gbps to the storage whereas the previous source host node had a path of 10 Gbps. This affects the performance of the virtual machine. Due to a lack of verification of the storage resources in the destination host node, it can happen that the virtual machine will not perform as well as in the original source host node and might even stop working. Thus, agreed performance levels cannot be maintained, as for example maximum latency to the storage.

Similar problems exist for service level agreements with respect to storage security, since there is no automatic mechanism in the cloud that combines the different security features of the network and storage solutions to provide the requested level of security. In addition there is also no mechanism that reacts to the changes that may affect the security. A cloud is a dynamic environment in which changes happen every day. Most of these changes affect security. For example, application data are moved to another storage solution having different security configurations, the application is evacuated to another board that uses a different Storage Area Network, new security features are added to the storage solutions or removed from or parts of the data are moved into faster tiers.

Network Functions Virtualization (NFV) is defined in Architectural Framework ETSI GS NFV 002 v1.1.1

Regarding storage, OVF 2.0 defines seven fields to describe the storage items needed for the virtual machine. This fields relate to an allocation of units, like a capacity needed; a description in human readable form, for example a virtual disk; an element name of the item to be created in order to provide the demanded storage; a unique instance ID; a reservation defining a minimum quantity of resources guaranteed to be available; a resource type defining the type of hardware that it is needed, like USB or Disk Drive; and a virtual quantity. However, even these parameters are not sufficient to describe the storage performance sufficiently. Despite of all these parameters storage performance related Service Level Agreements cannot be guaranteed within the clustered environment. A similar problem arises with respect to security related storage aspects in order to ensure a specific Service Level Agreement on storage security.

However, equally processing and checking a large number of target parameters with the same importance for their fulfillment is not efficient and may lead to inaccurate results if some parameters are in agreement and some are not in agreement for the virtual machine. If only some parameters are not in complete agreement, running of the virtual machine is prevented.

SUMMARY

It is an object of the present invention to more flexibly decide whether a virtual machine can be run on a destination host node.

According to a first aspect this object is solved by a method for running a virtual machine on a destination host node in a computer cluster, comprising the steps of requesting a set of target configuration parameters assigned to the virtual machine, wherein the target configuration parameters have prioritizations; requesting a set of actual configuration parameters of the destination host node for checking against the requested set of target configuration parameters; and running the virtual machine on the destination host node, if the set of actual configuration parameters of the destination host node falls within the set of target configuration parameters, wherein when selecting the destination host node, the prioritization of the target configuration parameters is considered. Running can involve changing the configuration of an existing virtual machine. Running can be additionally performed under consideration of configuration weight cost for running the configuration of the virtual machine with the set of target configuration parameters on the destination host node. By the method multiple target configuration parameters can be defined which are particularly important for a specific virtual machine. In comparison to an exact fulfillment of all target configuration parameters the virtual machine can be run more flexibly and a computer cluster system can be operated at higher capacity. Nevertheless the configuration of the virtual machine can be kept in compliance with the target configuration parameters, as defined in Service Level Agreements.

In an embodiment of the method the prioritizations classify the target configuration parameters in a priority order. In this embodiment the technical advantage is achieved that the target configuration parameters are ranked according their importance. Important target configuration parameters can be given more weight in fulfillment than other target configuration parameters.

In a further embodiment of the method an exact fulfillment of the target configuration parameter is requested in dependence of the priority order. In this embodiment the technical advantage is achieved that an exact fulfillment of important target configuration parameters is reached and Service Level Agreements can be maintained.

In a further embodiment of the method a certain range or deviation up to a specific percentage of the target configuration parameter is allowed in dependence of the priority order. In this embodiment the technical advantage is achieved that actual configuration parameters can vary in order to run the virtual machine more flexibly.

In a further embodiment of the method the prioritizations of the target configuration parameters are determined on the basis of a number of specific application models. In this embodiment the technical advantage is achieved that the prioritizations can be assigned fast on the basis of the specific application model indicating a type of the virtual machine.

In a further embodiment of the method the actual configuration parameters are determined on the basis of a cost matrix. In this embodiment the technical advantage is achieved that resource related costs can be considered.

In a further embodiment of the method the method comprises the step of terminating the virtual machine on a source host node, if the virtual machine has been run on the destination host node. In this embodiment the technical advantage is achieved that the virtual machine can be migrated from a source host node to a destination host node and resources of the virtual machine on the source host node can be freed.

In a further embodiment of the method an actual configuration parameter of the destination host node is determined on the basis of probing the actual configuration parameter of the destination host node. In this embodiment the technical advantage is achieved that up to date actual configuration parameters can be obtained.

In a further embodiment of the method the set of actual configuration parameters is determined by retrieving stored configuration parameters from a database for the destination host node. In this embodiment the technical advantage is achieved that the actual configuration parameters can be determined in a fast and reliable manner.

According to a second aspect this object is solved by a control node for running a virtual machine on a destination host node in a computer cluster, comprising a first requesting means for requesting a set of target configuration parameters assigned to the virtual machine, wherein the target configuration parameters have prioritizations; a second requesting means for requesting a set of actual configuration parameters of the destination host node for checking against the requested set of target configuration parameters; a running means for running the virtual machine on the destination host node, if the set of actual configuration parameters of the destination host node falls within the set of target configuration parameters; and a selecting means for selecting the destination host node under consideration of the prioritization of the target configuration parameters. By the control node the same technical advantages are achieved as by the method according to the first aspect.

In an embodiment of the control node the prioritizations classify the target configuration parameters in a priority order. In this embodiment the technical advantage is achieved that that the target configuration parameters are ranked according their importance. Important target configuration parameters can be given more weight in fulfillment than other target configuration parameters.

In a further embodiment of the control node the selecting means is adapted to request an exact fulfillment of the target configuration parameter in dependence of the priority order. In this embodiment the technical advantage is achieved that an exact fulfillment of important target configuration parameters is reached and Service Level Agreements can be kept.

In a further embodiment of the control node the selecting means is adapted to allow a certain range or deviation up to a specific percentage of the target configuration parameter in dependence of the priority order. In this embodiment the technical advantage is achieved that actual configuration parameter can vary in order to run the virtual machine more flexibly.

In a further embodiment of the control node the control node comprises a termination means for terminating the virtual machine on a source host node, if the virtual machine has been run on the destination host node. In this embodiment the technical advantage is achieved that the virtual machine can be migrated from a source host node to a destination host node and resources of the virtual machine on the source host node can be freed.

In a further embodiment of the control node the second requesting means comprises a probing means for determining an actual configuration parameter by probing the actual configuration parameter of the destination host node. In this embodiment the technical advantage is achieved that up to date and live actual configuration parameters can be obtained.

According to a third aspect this object is solved by a computer cluster system having several host nodes, comprising a control node according to the second aspect. In this embodiment the same technical advantages are achieved as by a control node according to the second aspect.

BRIEF DESCRIPTION OF THE DRAWINGS

Further embodiments may be described with respect to the following Figures, in which.

DETAILED DESCRIPTION OF EMBODIMENTS

Figure 1:
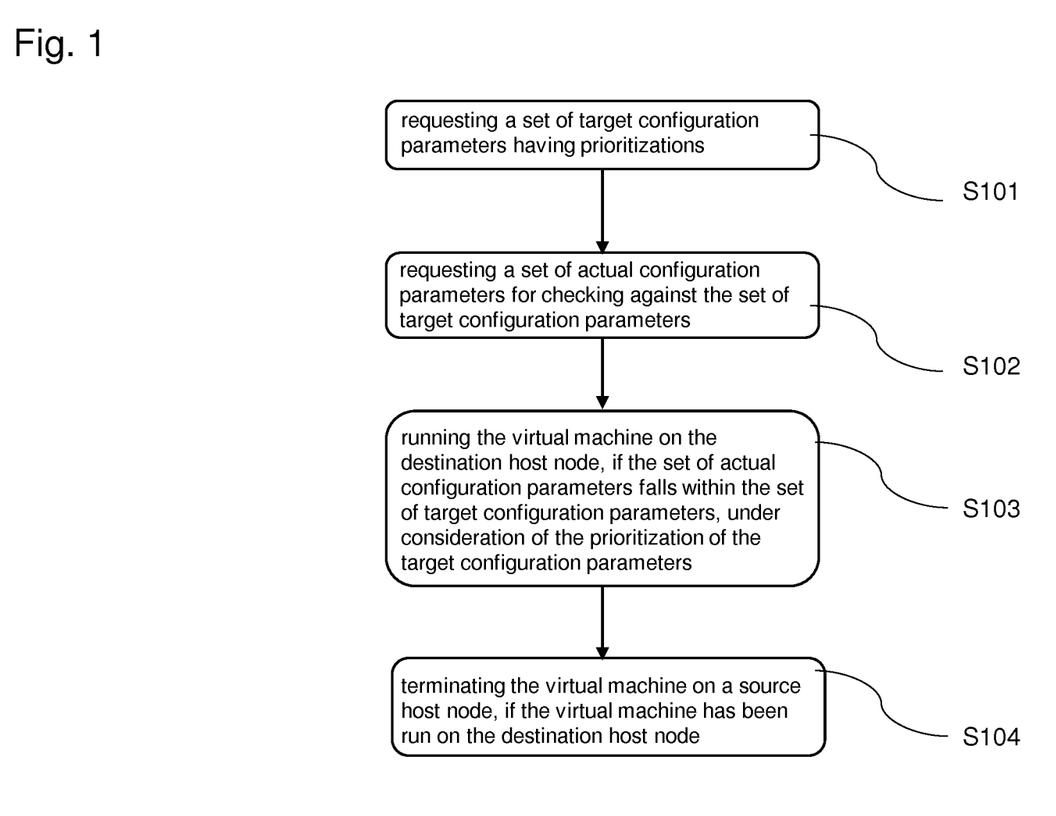
FIG. 1 shows a block diagram of a method for running a virtual machine on a destination host node.

FIG. 1 shows a block diagram of a method for running a virtual machine VM on a destination host node in a computer cluster. The virtual machine is an emulation of a particular computer system. The virtual machine operates based on an architecture of the host node and provides functions of a real or hypothetical computer. The implementation of the virtual machine can involve specialized hardware, software, or a combination of both. The host node comprises a processor and a memory that contains instructions executable by said processor. The method for running the virtual machine can be performed in a control node of a computer cluster system also comprising a processor and a memory that contains instructions executable by said processor. To this end the processor of the control node executes the method steps.

In step S101 a set of target configuration parameters assigned to the virtual machine is requested that includes prioritizations of the target configuration parameters. Requesting the set of target configuration parameters having prioritizations can be based on retrieving a set of pre-stored parameters from a database or a file. Requesting the set of target configuration parameters can also be performed by measuring or testing a pre-existing virtual machine on a source host node. In this case the set of target configuration parameters and the prioritization is defined by actual configuration parameters of a virtual machine as already running on a source host. The type of the target configuration parameters of the virtual machine to be newly run corresponds to the type of the actual configuration parameters of the virtual machine on the former source host node. Thus, the target configuration parameters of a source host can be migrated to the destination host.

The set of target configuration parameters may comprise parameters defining connectivity configuration characteristics in terms of latency, throughput or input output operations per second. The set of target configuration parameters may also comprise parameters defining security configuration characteristics in terms of encryption at rest, port masking, dedicated back-end, dedicated host or dedicated storage network. The set of set of target configuration parameters may also comprise parameters defining availability configuration characteristics in terms of redundancy level of disks, duplication of data storage, geo-redundancy or clustering of nodes.

The set of target configuration parameters defines multiple parameters which are important for a specific virtual machine. However, some of those target configuration parameters are more important than others depending on the application running inside the virtual machine. This is indicated by prioritizations. For example, a virtual machine which executes a banking application might give more importance to the security requirements than to the performance requirements. The different configurations matching the security demands of this virtual, might have different resource related costs e.g. encrypted storage or separate network.

In step S102 a set of actual configuration parameters of the destination host node for checking against the requested set of target configuration parameters is requested. Requesting the set of actual configuration parameters can be performed by retrieving the set of actual configuration parameters from a database or a file, in which the actual configuration parameters for a number of destination host nodes are pre-stored. However, requesting the set of actual configuration parameters can also be performed by probing or testing an actual configuration parameter of the destination host node, e.g. by running a bandwidth test on the destination host node.

Requesting the set of actual configuration parameters can be done for a number of destination hosts nodes. For example each set of actual configuration parameters for a number of destination hosts nodes can be retrieved from a database. Each of the actual configuration parameters is compared with the corresponding target configuration parameter. The virtual machine is then run on a destination host node that is selected from the number of destination host nodes on the basis of the set of actual configuration parameters under consideration of the prioritizations of the target configuration parameters.

In step S103 the virtual machine is run on the destination host node, if the set of actual configuration parameters of the destination host node falls within the set of target configuration parameters. When selecting the actual configuration parameters, the prioritization of the target configuration parameters is considered. Running includes initially deploying the virtual machine on the destination host node, migrating the virtual machine from a source host node to the destination host node or changing an existing virtual machine on the destination host node during runtime. Running can be performed under consideration of configuration weight cost for changing the configuration of the virtual machine with the set of target configuration parameters on the destination host.

The prioritizations classify the target configuration parameters in a priority order, e.g. by adding a ranking number from 1 to n. For example, the set of the target configuration parameters including prioritizations can be defined in a service level agreement SLA signed between the owner of a virtual machine and the owner of the cloud. In dependence of the priority order an exact fulfillment of the target configuration parameter can be requested. If for example one of the target configuration parameters demands a bandwidth of 10 Gbps with a high priority on the destination host node, the virtual machine is only run on the destination host node, if it actually provides a bandwidth of 10 Gbps or above. In contrast it is also allowed a certain range or deviation up to a specific percentage of the target configuration parameter in dependence of the priority order. If for example one of the target configuration parameters demands a bandwidth of 10 Gbps with a low priority on the destination host node, the virtual machine is run on the destination host node, if it only actually provides a lower bandwidth of 9 Gbps. The same can be applied for storage or safety requirements as target configuration parameters. By the prioritizations multiple configuration parameters can be defined which are important for running the virtual machine as well as configuration parameters that are less important. In comparison to an exact fulfillment of all target configuration parameters the virtual machine can be run more flexibly on a computer cluster system.

The prioritizations of the target configuration parameters can be determined on the basis of a number of specific application models. In one specific application model all target configuration parameters concerning security aspects of the virtual machine have a high priority, e.g. for a banking application. In another specific application model all target configuration parameters concerning bandwidth have a high priority, e.g. for a multimedia application. In this way it becomes possible to easily define prioritizations by assigning the virtual machine to a particular specific application model as a template.

In step S104 the virtual machine is terminated on the source host node, if the virtual machine has been run on the destination host node. In effect the virtual machine of the source host node can be migrated to the destination host node. The resources of the virtual machine of the source host node can be freed.

Figure 2:
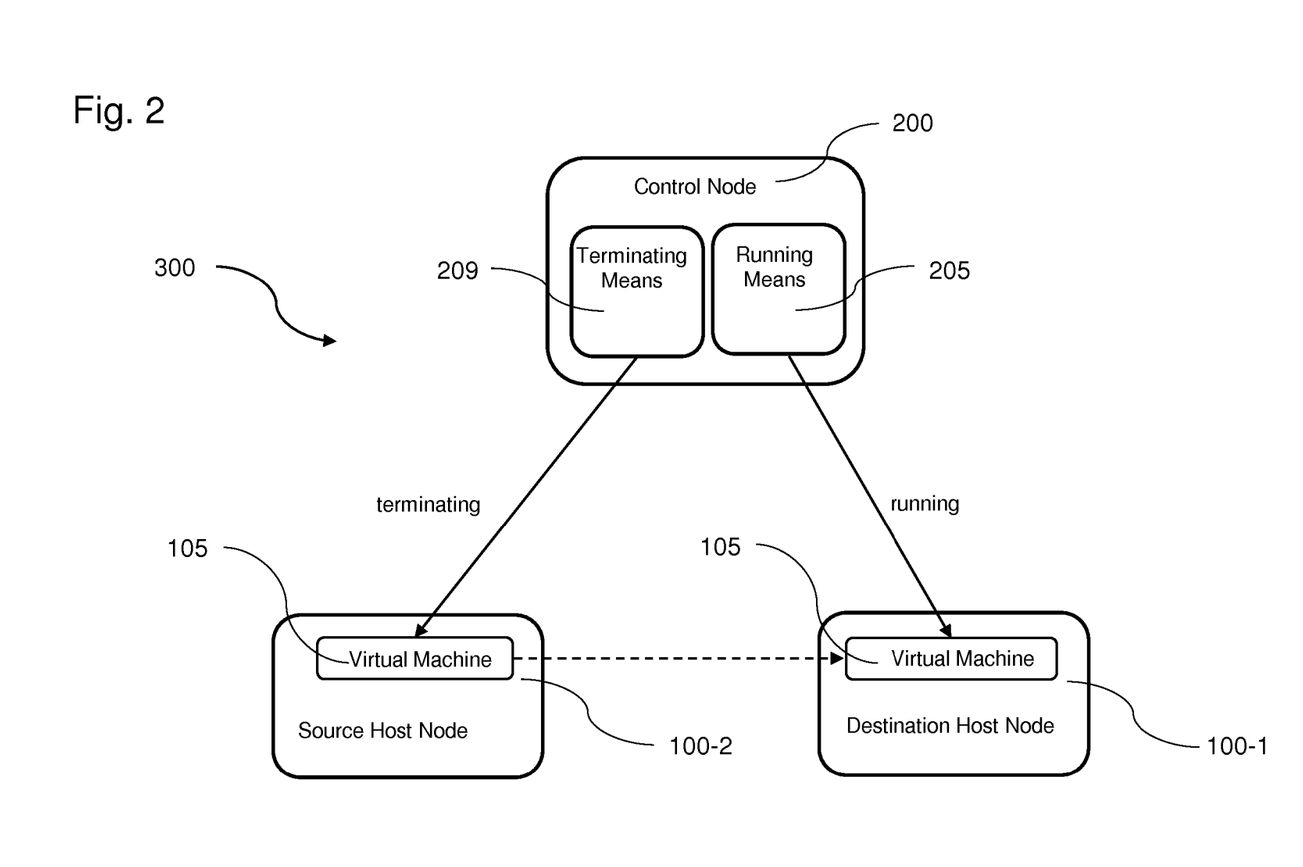
FIG. 2 shows a schematic view of a computer cluster system.

FIG. 2 shows a schematic view of a computer cluster system 300. The computer cluster system 300 comprises several host nodes 100-1 and 100-2. Host node 100-2 serves as a source host node 100-2 on which a pre-existing virtual machine 105 is currently running. Host node 100-2 is a destination host node 100-2 to which the virtual machine 105 from the source host node 100-2 should be migrated to. In addition the computer cluster system 300 comprises a control node 200 for controlling the virtual machine 105 on the destination host node 100-1 and the source host node 100-2.

The control node 200 comprises a running means 205 for running or starting the virtual machine 105 on the destination host node 100-1, if the set of actual configuration parameters of the destination host node 100-1 falls within the set of target configuration parameters. For running the virtual machine 105 on the destination host node 100-1 additionally the prioritizations of the target configuration parameters are considered, as explained above.

Further the control node 200 has a termination means 209 for terminating the virtual machine 105 on a source host node 100-2, if the virtual machine 105 has been successfully run on the destination host node 100-1. Running the virtual machine 105 on the destination host node 100-1 in combination with terminating the virtual machine on the source host node 100-1 while keeping the configuration of the virtual machine 105 corresponds to migrating the virtual machine from one host node 100 to another. Every means can be implemented as a computer program running on the processor or as a module.

Further, the control node 200 includes one or more processors (not shown in FIG. 2) coupled to the running means 205 and the terminating means 209 and a memory (not shown in FIG. 2) coupled to the processor(s). The memory may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory includes suitably configured program code to be executed by the processor(s) so as to implement the above-described functionalities of the intermediate node. In particular, the memory may include various program code modules for causing the node to perform processes as described above, e.g., corresponding to the method steps of FIG. 1.

Figure 3:
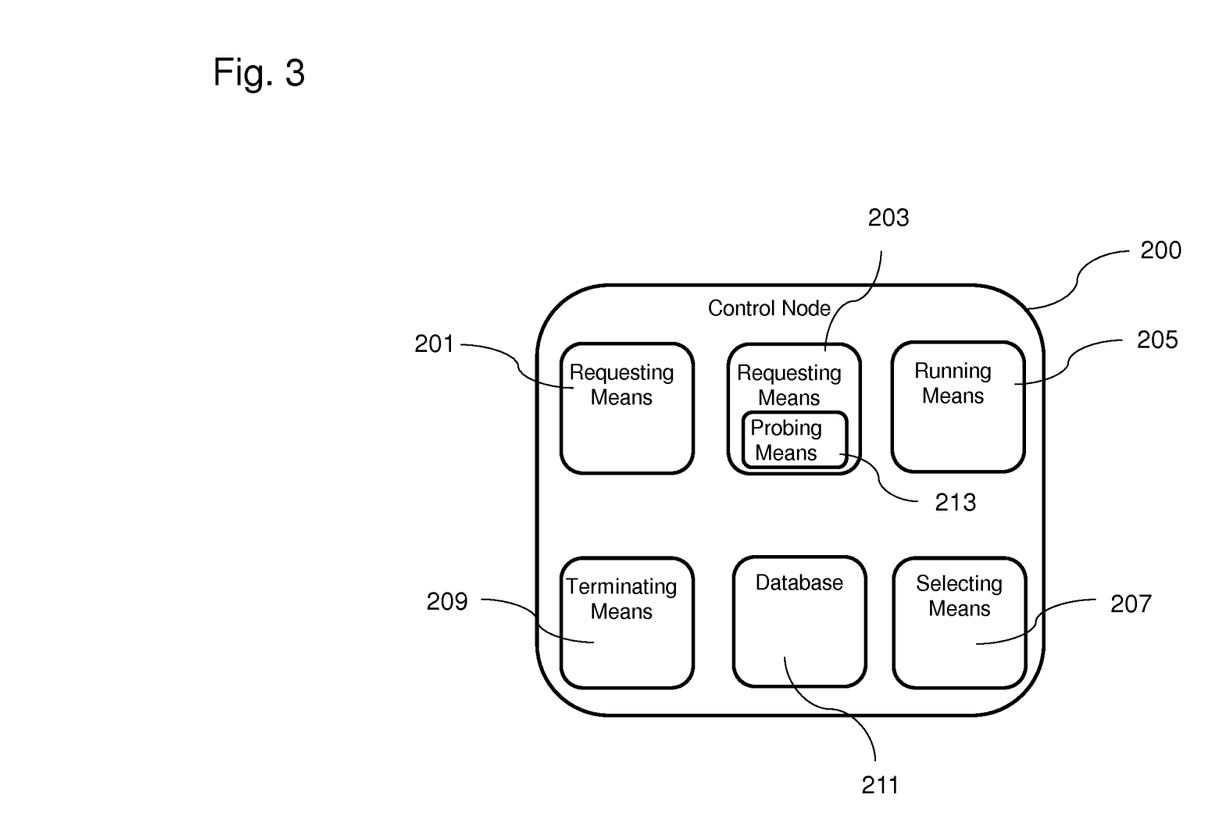
FIG. 3 shows a schematic view of a control node.

FIG. 3 shows a schematic view of the control node 200. The control node 200 comprises a processor and a memory that contains instructions executable by said processor. The control node 200 is connected to the host nodes 100 by means of a wired or wireless network. The control node 200 serves for controlling the virtual machine 105 on host nodes 100 in the computer cluster system 300.

The control node 200 comprises a first requesting means 201 for requesting a set of target configuration parameters assigned to the virtual machine 105 that have prioritizations and a second requesting means 203 for requesting a set of actual configuration parameters of the destination host node 100-1 for checking against the requested set of target configuration parameters. The set of target configuration parameters including their prioritizations can be subject to a service level agreement.

The second requesting means 203 comprises a probing means 213 for determining actual configuration parameters by probing the destination host node 100-1, e.g. by running a dummy virtual machine 105 or by using a memory or bandwidth test on the destination host node 100-1. Moreover, the probing means 213 can be adapted to probe connectivity configuration characteristics, security configuration characteristics or availability configuration characteristics as actual configuration parameters of the destination host node 100-1 by running specific test procedures on the destination host node.

Further the control node 200 comprises the running means 205 for running the virtual machine 105 on the destination host node 100-1, if the set of actual configuration parameters of the destination host node 100-1 falls within the set of target configuration parameters. A selecting means 207 serves for selecting a destination host node 100-1 having suitable actual configuration parameters under consideration of the prioritization of the target configuration parameters. The selecting means 207 can be adapted to request an exact fulfillment of the target configuration parameter in dependence of the priority order or to allow a certain range or deviation up to a specific percentage of the target configuration parameter in dependence of the priority order.

Further the control node 200 comprises the termination means 209 as discussed above. The control node 200 can comprise a database 211 for storing the set of actual configuration parameters for a number of destination host nodes 100-1 and the set of target configuration parameters including prioritizations assigned to each virtual machine 105. Every means can be implemented as a computer program running on the processor or as a module.

Figure 4:
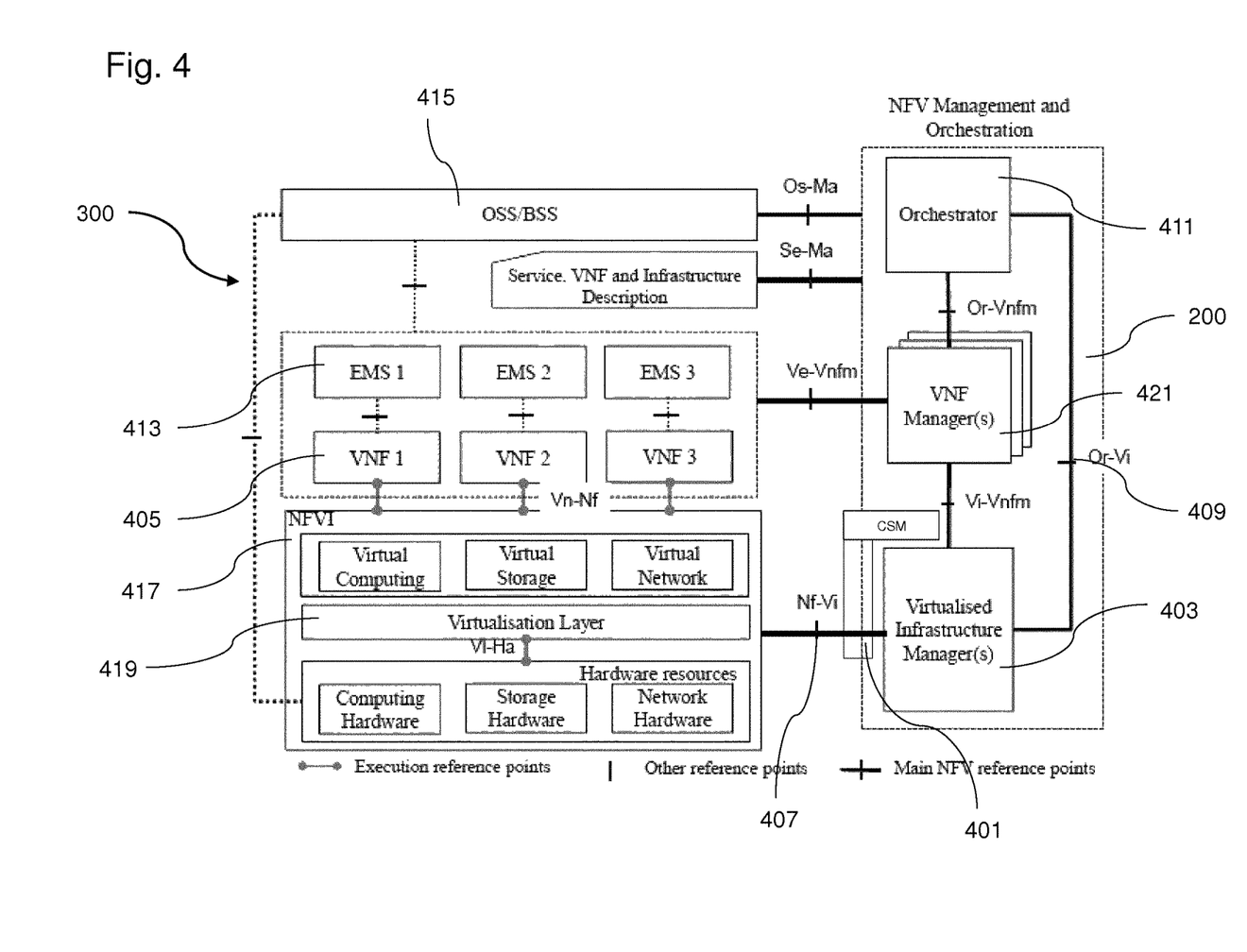
FIG. 4 shows a schematic view of an architectural framework.

FIG. 4 shows the NFV reference architectural framework of a computer cluster system 300 like a cloud. The computer cluster system 300 comprises Virtual Network Functions VNFs 405 and Element Management Systems EMS 413. These are controlled by Operations Support Systems and Business Support Systems OSS/BSS 415. The Network Function Virtualization Infrastructure NFVI comprises virtual computing resources, virtual storage resources and virtual network resources above a virtualization layer 419. Beneath the virtualization layer 419 computing hardware, storage hardware and network hardware are located. The control node 200 comprises several Virtual Network Functions Managers 421, an orchestrator 411, a Virtualized Infrastructure Manager VIM 403 and a Cloud Storage Manager CSM 401.

The Cloud Storage Manager 401 is a functionality, which can be implemented as own entity or collocated within the Virtualized Infrastructure Manager VIM 403. The Cloud Storage Manager 401 has an internal logic. The new logic can retrieve the information for the decision whether the set of target configuration parameters are met in several steps.

First a set of target configuration parameters having prioritizations is determined, like storage parameters pre-stored for virtual machines 105 belonging to Virtual Network Functions 405 in the orchestrator. Then a corresponding set of actual configuration parameters of the destination host node 100-1 is determined, e.g. on the basis of a storage history or an observed storage profile of the virtual machine 105 on the source host node 100-2. In addition a probing on the new destination host 100-2 can be performed before running the virtual machine 105 on the destination host node 100-1 in order to obtain the set of actual configuration parameters.

In this context the Cloud Storage Manager 401 serves as the requesting means 201 for requesting a set of target configuration parameters having prioritizations for running the virtual machine 105 on the destination host node 100-1 and as the requesting means 203 for requesting a set of actual configuration parameters of the destination host node 100-1 for checking against the target configuration parameters.

The information about the target configuration parameters including their prioritization, like storage and security features, e.g. a storage type/speed, will be kept in a database within the Cloud Storage Manager 401. The most appropriate configuration over the lifetime will be adapted. The Cloud Storage Manager 401 collects information from the host nodes 100 as actual configuration parameters and stores this data into its database. The Cloud Storage Manager 401 has an interface to all the storage back-ends and to all the host nodes 100.

The set of target configuration parameters together with the exact values or value ranges that are to be fulfilled can be manually pre-configured in the cloud storage manager data base by the cloud administrator. Inside the CSM database there is a matrix which contains the different devices present in the cloud environment and the features that they provide together with the cost of applying these features. The cost is defined from the resources cost point of view. That matrix is updated whenever there is a change in the resource environment, e.g. encrypted storage has been added to the environment or the storage is scaled up. Also during the lifetime of a virtual machine configuration these changes can be taken into account and a better deployment option can be chosen.

The Cloud Storage Manager 401 calculates the different alternatives which would fulfill the set of target configuration requirements and selects the one with the least cost. However, in the case that there are no options to fulfill the request, two solutions can apply.

The first solution requires manual intervention. The Cloud Storage Manager 401 enquires the user if the requested parameters are correct and presents existing alternatives which are close to the set of configuration requirements. The second solution means proposing changes in the environment which provide a solution fulfilling the requirements. For example, doing block migration between storage solutions. This step involves interaction with the administrator to accept this change.

The interface to the storage back-ends of the host nodes 100 allows the Cloud Storage Manager 401 to obtain the necessary information to take the most appropriate decision for running the virtual machine 105 on a destination host node 105 under consideration of prioritizations. The retrieved information as actual configuration parameters of the destination host node 100 is for example a storage parameter such as total performance offered by a storage, a spare performance not used yet, a RAID level or current security features. That information feeds the database of the Cloud Storage Manager 401 and it is dynamically updated, e.g. when the storage solution scales or a new storage solution is added to the system.

The information in the database of the Cloud Storage Manager 401 will be used by a selecting algorithm which decides which destination host node 100 is the best one for the virtual machine 105. The term "best host" is to be understand as a host guaranteeing the best back-end parameters. Thus, the host may for example be connected via any appropriate network to an external storage. At the end the host provides characteristics describing the capabilities of the host including possible back-end capabilities offered when running the virtual machine on said host.

The selecting algorithm takes into account the obtained virtual machine storage profile (OVF or measured) as target configuration parameters and matches this against the characteristics of the different destination host nodes 100 under consideration of prioritizations. If the storage profile should be maintained, a high priority is assigned to the storage profile. Pre-configured policies weight the target configuration parameters like latency, IOPS, security with specific costs onto a target configuration parameter.

The interface between Cloud Storage Manager 401 and the host nodes 100 is used before the deployment of a virtual machine 105 in the new destination host node 100-1. The deployment could be triggered by various events. Before deploying the virtual machine 105, the Cloud Storage Manager 401 can trigger a probing mechanism in the destination host node 100-1, e.g. by using the storage profile of the virtual machine 105. The probing results are a basis for determining an actual configuration parameter that is used by the Cloud Storage Manager 401 to assess if the virtual machine 105 will obtain the necessary performance, for example as defined in the SLA or in the OVF. The probing can for example be performed by a virtual machine 105 running on the host hypervisor or by a dummy virtual machine 105. If the hypervisor does not provide the ability of probing, this step can be performed by a specific probing virtual machine 105.

Several interfaces exist from the Cloud Storage Manager 401 to existing Network Function Virtualization NFV. A Nf-Vi interface 407 between the Cloud Storage Manager 401 and the Virtualized Infrastructure Manager VIM 403 that is used to detect new storage hardware or request storage utilization. An interface Or-Vi 409 between the Virtualized Infrastructure Manager VIM 403 and an orchestrator 411 serves for requesting a VNF profile.

Figure 5:
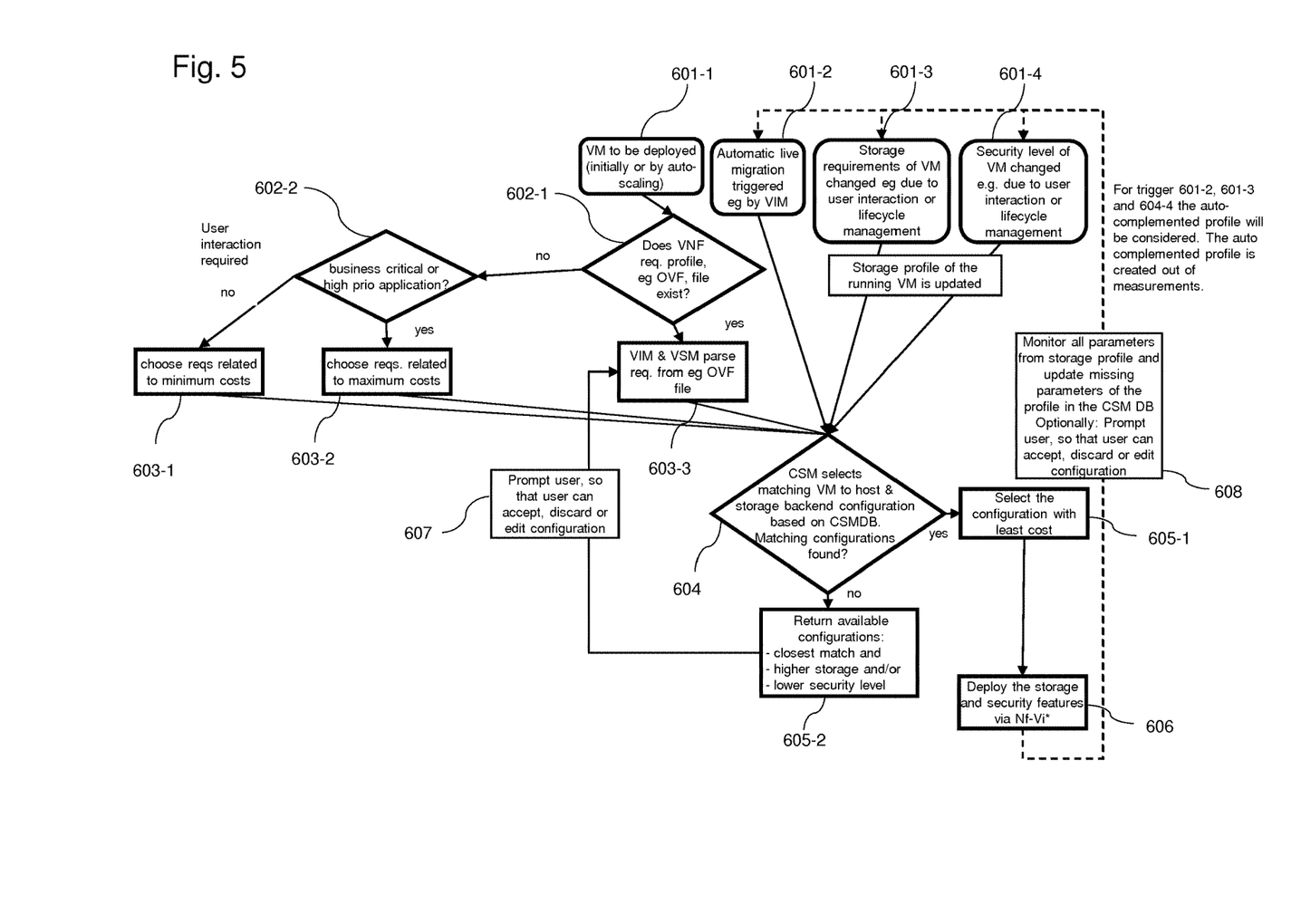
FIG. 5 shows a flow chart of an algorithm.

FIG. 5 shows a flow chart illustrating the algorithm of a cloud system 300. Trigger 601-1, 601-2, 601-3 and 601-4 are several events which can trigger the Cloud Storage Manager 401 to be involved in a new selection procedure of a host node 100 for the virtual machine 105. In trigger 601-1 a cluster resource manager triggers the deployment of a virtual machine 105. This can be an initial deployment of the virtual machine 105 or a deployment resulting from an auto-scaling procedure. In trigger 601-2 the cluster resource manager triggers the migration of the virtual machine 105 to another destination host node 100-1. This can be for example due to power management or due to additional or removed hosts in the system. In trigger 601-3 the storage requirements of the virtual machine 105 have changed e.g. due to user interaction or lifecycle management. It might also be that the storage utilization of the virtual machine 105 has changed and this requires migrating the virtual machine 105. In trigger 601-4 the security level of the virtual machine 105 has changed e.g. due to user interaction or lifecycle management. In the case of trigger 601-2, 601-3 and 601-4 there is a storage profile for the virtual machine 105 available on the host which is based on the historical data of the storage usage of the virtual machine 105. In the case of trigger 601-1 initial deployment no measured data are available. For trigger 601-2, 601-3 and 601-4 an auto-complemented configuration profile will be considered. The auto-complemented configuration profile is created out of measurements. For trigger 601-3 and 601-4 a storage profile of the running virtual machine 105 is updated.

In step 602-1 it is checked whether a Virtualized Network Function required profile file having prioritizations exists, like for example extended OVF. The Cloud Storage Manager 401 queries the Virtualized Infrastructure Manager VIM 403 whether storage requirements have been specified for the virtual machine 105 e.g. as an OVF profile. The set of configuration parameters in a storage specification profile can be maximum latency, ratio of reads/writes, number of IOPS, ratio of random/sequential and/or block size.

To understand if the virtual machine 105 will have any performance impact with respect to storage, the storage requirements of the virtual machine 105 should be known. In step 602-2 it is checked whether the virtual machine 105 is a business critical or highly prioritized application. In case in step 602-1 sufficient parameters could not be retrieved, the criticality of the application can be considered by default. In general business critical applications and less critical applications are running within the same environment. Each of these applications can be treated differently and independently. Each virtual machine 105 can be described by a VNF parameter, like in OVF, indicating whether the virtual machine 105 is business critical or not.

When this parameter is available, in steps 603-1 and 603-2 different default profiles, i.e. set of target configuration parameters, will be applied based on how critical the application is. In step 603-1 a destination host node 100 is chosen related to minimum costs under consideration of the prioritizations. In step 603-2 a destination host node 100-1 is chosen related to maximum costs under consideration of the prioritizations. In step S603-3 the Virtualized Infrastructure Manager and Virtualized Storage Manager parse the requirements given by the target configuration parameters, e.g. from an OVF file.

In step S604 the target configuration parameters, i.e. the storage profile, of the virtual machine 105 obtained from the previous steps are used as input. The Cloud Storage Manager 401 checks which destination host nodes 100-1 fulfill the requirements on storage and on security levels and the related costs to this configuration in dependence of the prioritizations.

To this end a cost matrix is assessed which weights the costs on the storage and security levels and maps these parameters on one or more target configuration parameters. In this context it is assumed that each host node 100 has a service that runs against the storage volumes and provides a characterization of the different storage volumes to the Cloud Storage Manager 401.

If in step 605-1 matching configurations are found on the basis of a matching actual configuration parameter corresponding to the previously determined target configuration parameter, the host node 100 connected to the least cost is selected. This can be based on pre-configured mappings which connect the costs with storage parameters like latency and IOPs. If in step 605-2 no matching configuration is found on the basis of a matching actual parameter corresponding to the previously determined target configuration parameter, the closest match is returned to the Virtualized Infrastructure Manager 403. Optionally a list of host nodes 100 providing higher/lower actual parameters can be provided, i.e. higher/lower actual configuration parameter like storage and security configuration parameters.

In step 606 it is checked against the Virtualized Infrastructure Manager whether the requested storage and security features can be delivered from the selected host nodes 100 according the latest information of the Virtualized Infrastructure Manager 403. The storage and security features are deployed via the interface Nf-Vi* 407.

In step 607 a user is prompted, so that user can accept, discard or edit configuration details. In step 608 all parameters from storage profile are monitored and missing parameters of the profile in the Cloud Storage Manager Database are updated. Optionally a user is prompted so that user can accept, discard or edit the configuration.

This invention ensures that target configuration parameters, as defined in service level agreements, can be guaranteed during the entire life time even in situations, in which life as well as offline migration of virtual machines 105 occurs in a highly available virtualized environment. A further advantage of the invention is that with the proposed extended mechanisms for life migration of storage performance and storage security related Service Level Agreements (SLAs) can be guaranteed for the whole lifetime of the virtual machine 105. Leveraging life-migration for planned as well in a semi as well as fully automated manner, helps to further increase the In-Service-Performance of virtual machines 105 or clusters of them.

The security mechanisms of the computer cluster system 300 are abstracted from the administrator and applied automatically. Data confidentiality and multi-tenancy requirements from the application are always covered, even in very changing environments Existing mechanisms for life migration of virtual machines 105 are extended by new logic to ensure that Service Level Agreements SLAs are considered during the migration process and can therefore be guaranteed for the complete lifetime of a virtual machine 105. SLAs can be used in the area of storage performance as well as storage security. A relationship between VNF functions on host nodes 100 is considered and their connection to storage back ends can be guaranteed over life time. A creation of VNF profiles and update of VNF profiles is allowed during life time. Initial deployment and life migrations of virtual machines 105 are improved to avoid non-matching placements on combinations of host nodes 100 towards storage back ends. A continuous adaptation of storage security configurations towards available security functions and zones as well as an increase or decrease of security level of storage for virtual machines 105 over lifetime is facilitated.

The method and the control node 200 implement a way to handle a new dimension in the set of configuration parameters. The virtual machine or the user of that virtual machine can define the importance of the target configuration parameters which are provided e.g. through the OVF by assigning prioritizations. Depending on the importance, i.e. the prioritizations, the Cloud Storage Manager can request their exact fulfillment or allows a certain range or deviation up to a specific percentage. For defining prioritizations of target configuration parameters multiple specific application models can be used. Each application can be classified into a specific application model, e.g. like media applications or banking applications. Each specific application classifies the target configuration parameters in a different priority order, in which e.g. performance parameters are more important than reliability parameters or vice versa.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A method of running a virtual machine on a destination host node in a computer cluster, the method comprising:
   requesting a set of target configuration parameters assigned to the virtual machine, wherein the target configuration parameters have prioritizations;
   requesting a set of actual configuration parameters of the destination host node for checking against the requested set of target configuration parameters; and
   running, if the set of actual configuration parameters of the destination host node falls within the set of target configuration parameters, the virtual machine on the destination host node;
   wherein when selecting the destination host node the prioritization of the target configuration parameters is considered;
   wherein the prioritizations classify the target configuration parameters in a priority order; and
   wherein in dependence of the priority order, a certain range or deviation up to a specific percentage of the target configuration parameter is allowed.

2. The method of claim 1, wherein in dependence of the priority order an exact fulfillment of the target configuration parameter is requested.

3. The method of claim 1, wherein the prioritizations of the target configuration parameters are determined based on a number of specific application models.

4. The method of claim 1, wherein the actual configuration parameters are determined based on a cost matrix.

5. The method of claim 1, further comprising terminating the virtual machine on a source host node if the virtual machine has been run on the destination host node.

6. The method of claim 1, wherein an actual configuration parameter of the destination host node is determined based on probing the actual configuration parameter of the destination host node.

7. The method of claim 1, wherein the set of actual configuration parameters is determined by retrieving stored parameters from a database for the destination host node.

8. A control node for running a virtual machine on a destination host node in a computer cluster, the control node comprising:
   processing circuitry;
   memory comprising instructions executable by the processing circuitry whereby the control node is operative to:
      request a set of target configuration parameters assigned to the virtual machine, wherein the target configuration parameters have prioritizations;
      request a set of actual configuration parameters of the destination host node for checking against the requested set of target configuration parameters;
      run, if the set of actual configuration parameters of the destination host node falls within the set of target configuration parameters, the virtual machine on the destination host node;
      select the destination host node with consideration of the prioritization of the target configuration parameters; and
      wherein the instructions are such that the control node is operative to allow a certain range or deviation up to a specific percentage of the target configuration parameter in dependence of the priority order.

9. The control node of 8, wherein the prioritizations classify the target configuration parameters in a priority order.

10. The control node of claim 9, wherein the instructions are such that the control node is operative to request an exact fulfillment of the target configuration parameter in dependence of the priority order.

11. The control node of claim 8, wherein the instructions are such that the control node is operative to terminate the virtual machine on a source host node, if the virtual machine has been run on the destination host node.

12. The control node of claim 8, wherein the instructions are such that the control node is operative to determine an actual configuration parameter by probing the actual configuration parameter of the destination host node.

13. A computer cluster system, comprising:
   a plurality of host nodes;
   a control node comprising:

processing circuitry;

memory containing instructions executable by the processing circuitry whereby the control node is operative to:

request a set of target configuration parameters assigned to the virtual machine, wherein the target configuration parameters have prioritizations;

request a set of actual configuration parameters of the destination host node for checking against the requested set of target configuration parameters;

run, if the set of actual configuration parameters of the destination host node falls within the set of target configuration parameters, the virtual machine on the destination host node;

select the destination host node with consideration of the prioritization of the target configuration parameters; and wherein the instructions are such that the control node is operative to allow a certain range or deviation up to a specific percentage of the target configuration parameter in dependence of the priority order.

\* \* \* \* \*